United States Patent
Peckham et al.

(10) Patent No.: US 8,280,895 B2
(45) Date of Patent: *Oct. 2, 2012

(54) MULTI-STREAMED METHOD FOR OPTIMIZING DATA TRANSFER THROUGH PARALLELIZED INTERLACING OF DATA BASED UPON SORTED CHARACTERISTICS TO MINIMIZE LATENCIES INHERENT IN THE SYSTEM

(75) Inventors: Derrick Shea Peckham, Fresno, CA (US); Jason Daniel Dictos, Fresno, CA (US)

(73) Assignee: Barracuda Networks Inc, Campbell, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/497,564

(22) Filed: Jul. 3, 2009

(65) Prior Publication Data
US 2011/0004601 A1  Jan. 6, 2011

(51) Int. Cl.
*G06F 17/30* (2006.01)
(52) U.S. Cl. ......... 707/752; 707/754; 707/758; 707/802
(58) Field of Classification Search .................. 707/754, 707/758, 802
See application file for complete search history.

(56) References Cited

U.S. PATENT DOCUMENTS

| | | | | |
|---|---|---|---|---|
| 5,586,264 A * | 12/1996 | Belknap et al. | ............... | 725/115 |
| 6,049,823 A * | 4/2000 | Hwang | ........................... | 725/82 |
| 6,449,688 B1 * | 9/2002 | Peters et al. | .................. | 711/112 |
| 6,691,149 B1 * | 2/2004 | Yokota et al. | .................. | 709/201 |
| 6,925,499 B1 * | 8/2005 | Chen et al. | ..................... | 709/226 |
| 7,054,927 B2 * | 5/2006 | Ulrich et al. | .................. | 709/223 |
| 7,536,693 B1 * | 5/2009 | Manczak et al. | ............... | 718/105 |
| 2001/0038642 A1 * | 11/2001 | Alvarez et al. | ................ | 370/477 |
| 2001/0054131 A1 * | 12/2001 | Alvarez et al. | ................ | 711/105 |
| 2002/0083118 A1 * | 6/2002 | Sim | ................................ | 709/105 |
| 2002/0133491 A1 * | 9/2002 | Sim et al. | ........................ | 707/10 |
| 2003/0033308 A1 * | 2/2003 | Patel et al. | ....................... | 707/10 |
| 2003/0126247 A1 * | 7/2003 | Strasser et al. | ................ | 709/223 |
| 2003/0187866 A1 * | 10/2003 | Zelenka | ........................... | 707/102 |
| 2005/0091234 A1 * | 4/2005 | Hsu et al. | ....................... | 707/100 |
| 2009/0063591 A1 * | 3/2009 | Betten et al. | ................... | 707/205 |

* cited by examiner

*Primary Examiner* — Charles Kim
*Assistant Examiner* — Fatima Mina
(74) *Attorney, Agent, or Firm* — Patentry

(57) ABSTRACT

A method which operates a plurality of threads in parallel on disparate file sizes ordered by an additional thread. Efficiently backing up of heterogeneous non-volatile mass store to a network attached server scalably distributes computing hashes and eliminating duplication. The method segments each file and object into a hierarchy of pieces in a plurality of types and avoids sending unnecessary pieces.

7 Claims, 8 Drawing Sheets

MULTI-STREAMED METHOD FOR OPTIMIZING DATA TRANSFER THROUGH PARALLELIZED INTERLACING OF DATA BASED UPON SORTED CHARACTERISTICS TO MINIMIZE LATENCIES INHERENT IN THE SYSTEM

A related co-pending patent application is Ser. No. 12/497,563 filed 3 Jul. 2009.

BACKGROUND

It is known that non-volatile mass storage may be backed up in serial format to attached tape drives. Checksums are computed on files or file boundary within archive files e.g. zip file to determine redundancy. Conventional multi-threading applied to disk I/O causes disk head contention, fluctuations in transfer rate, and sub-optimal throughput.

It is known that already existing de-dupe model in place requires that files be broken up into pieces, with each piece representing at most a 1 MB section of the file. It is known that this piece is then finger printed using a SHA-1 or DES and MD5, and is added to a global fingerprint store. It is known that it was not as optimal as it could be since the finger prints were generated on the appliance itself, and files had to be read over the network prior to their finger print being generated.

Backing up is universally recognized and generally ignored because of the inconvenience and unnecessary duplication. Backing up over a public or private networks creates congestion that impacts all other users. Latency of the non-volatile mass store apparatus and the network interfere with the users immediate productivity.

Thus it can be appreciated that what is needed is improvements in methods and apparatus to scalability redistribute backup processing from centralized resources to the clients and improved scheduling of disk accesses to minimize unavailability due to backup activity.

SUMMARY OF THE INVENTION

A method for optimizing data transfer through parallelized interlacing of data is based upon sorted characteristics to minimize latencies inherent in the system. A method for scheduling file access to a non-volatile mass store by a plurality of parallel threads controlling a processor comprising:
  determining a list of files for processing,
  sorting a list of files by an orderable characteristic,
  assigning beginning of the file list to a first thread controlling a processor,
  assigning end of the file list to a second thread controlling a processor,
  assigning at least one intermediate point of the file list to one or more additional threads.

In an embodiment the characteristic is the size of the file. It is the observation of the inventors that substantial throughput advantages are obtained by operating a plurality of threads in parallel on files of disparate sizes. An additional thread is operated solely to administer the insertion of file identifiers into a sorted list of file identifiers.

The present invention provides more efficient backup of heterogeneous nonvolatile mass storage by non-duplicative piece-wise transmission to a network server and network attached server method and apparatus.

The present invention is a method for copying files from nonvolatile mass storage into a pieces store. The identity of each file selected for backup is placed on a list sorted by size. At least three threads operate in parallel independently on the list by each selecting a file from a certain position. Each file is converted into a hierarchy of pieces and a plurality of piece types. A single first piece type is written into piece store for each file comprising name, size, and date. At least one third piece type is written into piece store for each file of variable length but maximum size containing a data shard. A single second piece type is written into piece store for each third piece type. Each thread operates in a file taken from a position in the list of files sorted by size. The positions are the top, bottom, and midpoint of the sorted file list. An optional fourth position is between the midpoint and the smallest file position.

The method further comprises
  receiving a sorted list of most frequently encountered type 2 pieces already stored at the network attached backup apparatus,
  matching the type 2 piece determined by the method with a type 2 piece in the list of most frequently encountered type 2 pieces, and
  removing from pieces store the type 3 piece corresponding to a type 2 piece found on the list of the most frequently encountered type 2 pieces. This creates more room for additional type 1 and type 2 pieces in the pieces store. Computing and comparing hashes at each user station improves scalability of the network attached backup apparatus.

The present invention is a method for selectively transmitting files in whole or in part from a pieces store through a network to a backup apparatus.

The method comprises
  receiving a request into a request buffer,
  selectively transferring pieces from piece store into a reply buffer, and
  transmitting the reply.

Receiving a request into a request buffer comprises determining whether Skip or next are indicated for each piece in the request buffer. If a piece type 1 has a skip indicator, all the type 2 and type 3 pieces for that file associated with the piece type 1 are removed from the piece store. If a piece type 2 has a skip indicator, the type 3 piece corresponding to that type 2 piece is removed from the piece store.

All type 1 pieces are transferred from the piece store to the reply buffer.
  If a piece type 1 has a next indicator in the request buffer, as many type 2 pieces as possible corresponding to that piece type 1 are transferred from piece store to the reply buffer.
  If a piece type 2 has a next indicator in the request buffer, the corresponding piece type 3 is transferred from piece store to the reply buffer.
  writing new pieces into the piece store is enabled whenever there is room and new pieces e.g. type 1, may be transferred into the reply buffer.

When either the reply buffer or piece store is full, transferring pieces is stopped and the reply is transmitted to the network attached backup apparatus. Within the network attached backup apparatus, a skip indicator is put in the request buffer if a file or is a shard has been previously seen as determined by comparing type 1 pieces and type 2 pieces with previously received pieces.

The basic flow of steps which occur during a backup is as follows:
1. Receive request that an Object be backed up on the Users Machine.
2. Builds a list of files that are associated with the Object selected in step #1, and start populating Pieces Store.
3. Request the next Piece.

4. Build a reply for as many Pieces that fit in a reply buffer and return the reply.
5. Compare the reply with archive, and create another request with "Skip" flags in each request, indicating whether the specific Piece needs to be skipped or sent.
6. Receive the skip request entries, by deleting Pieces which are to be skipped, and build another reply for the next available set of Pieces ready.
7. Steps 3 through 6 then repeat until there are no more files to be processed.

DETAILED DISCLOSURE OF EMBODIMENTS

Figure 1:
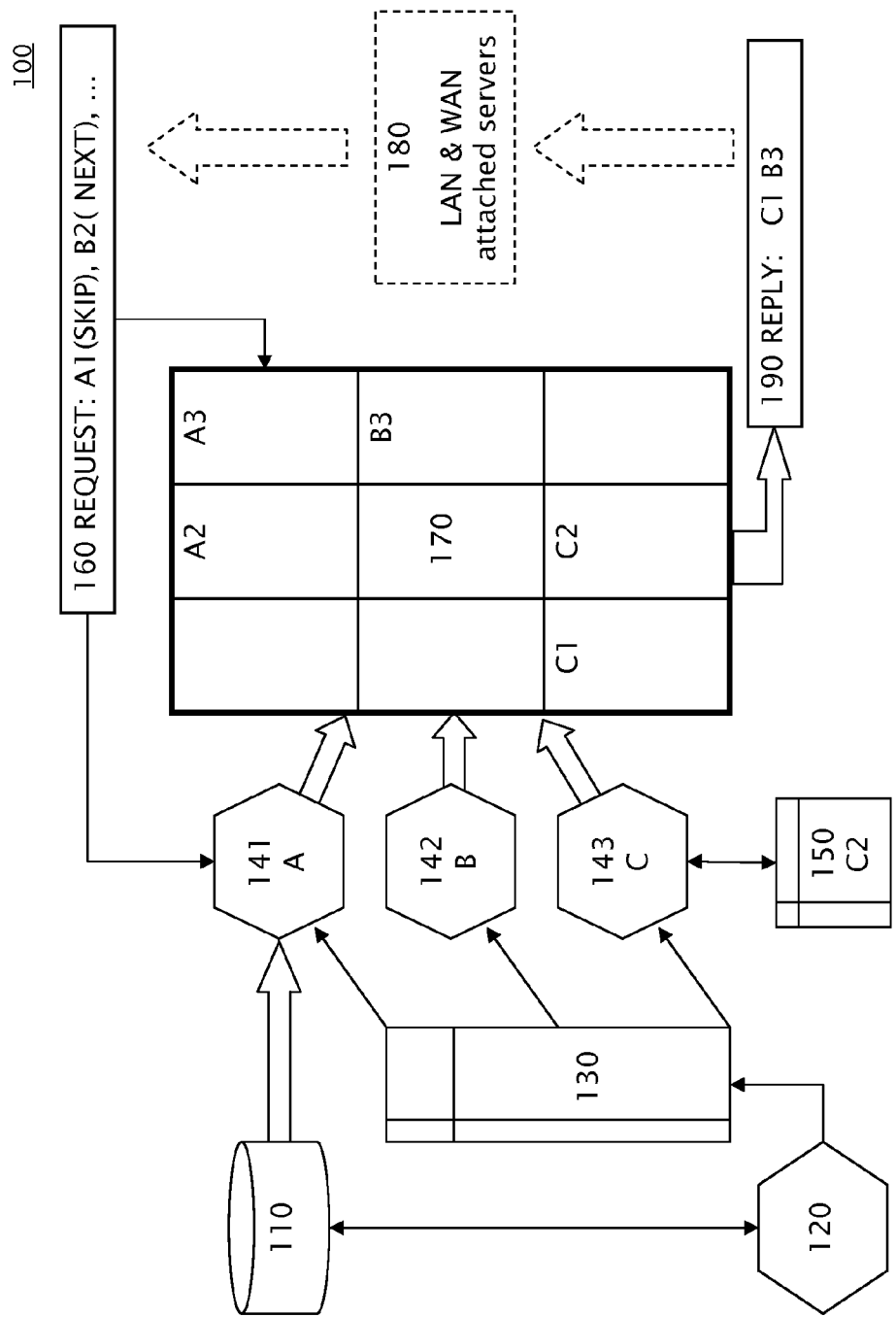
FIGS. 1 through 8 are data flow diagrams.

The invention comprises a method comprising the following processes:
  receiving an object selection comprising a plurality of files,
  scanning files on a non-volatile mass store,
  ordering the file identities according to a criteria,
  merging identities of the files into a list of ordered file identities.
The invention further comprises the following processes in parallel:
a first process comprising
  removing a first file identity from the top of the list of ordered file identities,
  reading the first file from a non-volatile mass store,
  operating on the first file in a first stream;
a second process comprising
  removing a second file identity from the bottom of the list of ordered file identities,
  reading the second file from a non-volatile mass store,
  operating on the second file in a second stream.
The invention further comprises at least one additional parallel process comprising:
  removing an additional file identity from the list of ordered file identities at a certain point intermediate between the top and the bottom,
  reading the additional file from a non-volatile mass store,
  operating on the additional file in an additional stream.
In an embodiment operating on a file comprises:
  writing an object to an object store,
  encapsulating an object by the logical tape formatter,
  writing to the device.
In an embodiment operating on a file comprises:
  converting each file into a hierarchy of pieces and a plurality of piece types,
  writing a single first piece type into piece store for each file comprising name, size, and date,
  writing at least one third piece type into piece store for each file of variable length but maximum size containing a data shard,
  writing a single second piece type into piece store for each third piece type.
In an embodiment the invention further comprises:
  receiving from a backup apparatus a sorted list of most frequently encountered type two pieces already stored at the network attached backup apparatus,
    matching the type 2 piece determined by the method with a type 2 piece in the list of most frequently encountered type 2 pieces, and
    removing from pieces store the type 3 piece corresponding to a type 2 piece found on the list of the most frequently encountered type 2 pieces
  whereby more room is available for additional type 1 and type 2 pieces in the pieces store, and
  whereby computing and comparing hashes at each user station improves scalability of the network attached backup apparatus.

The present invention provides efficient backup of heterogeneous non-volatile mass store to a network attached server. Distribution of computing hashes and eliminating duplication improves scalability of backup processes. Increased granularity of file pieces matches blocking of file I/O with network transmission. Each network transmission block is efficiently packed using sequence search criteria. The method avoids sending undesired pieces. Each file and object is segmented into a hierarchy of pieces in a plurality of types.

In an embodiment, a method for selectively transmitting files in whole or in part from a pieces store through a network to a backup apparatus comprises:
  receiving a request into a request buffer,
  selectively transferring pieces from piece store into a reply buffer, and
  transmitting the reply,
wherein receiving a request into a request buffer comprises determining whether Skip or next are indicated for each piece in the request buffer, if a piece type 1 has a skip indicator, all the type 2 and type 3 pieces for that file associated with the piece type 1 are removed from the piece store, if a piece type 2 has a skip indicator the type 3 piece corresponding to that type 2 piece is removed from the piece store.

In an embodiment, the method further comprises
  transferring all type 1 pieces from the piece store to the reply buffer,
  if a piece type 1 has a next indicator in the request buffer, transferring as many type 2 pieces related to that piece type 1 as possible from piece store to the reply buffer,
  if a piece type 2 has a next indicator in the request buffer, transferring the corresponding piece type 3 from piece store to the reply buffer,
  writing new pieces into the piece store and transferring new type 1 pieces into the reply buffer,
  when either the reply buffer or piece store is full, transferring pieces is stopped and the reply is transmitted to the network attached backup apparatus.

An embodiment comprises an apparatus comprising
  a network adapter,
  a request buffer,
  a piece management circuit,
  a reply buffer, and
  a piece store.

An embodiment comprises a method comprising the steps following:
  receiving a request from an apparatus into a request buffer,
while a reply buffer has available capacity:
  transferring all type 1 pieces from the piece store to the reply buffer and removing the transferred type 1 pieces from the piece store,
  determining a skip or next indication for each piece in the request buffer,
  for each type 1 piece in the request buffer having a next indication, transferring at least one type 2 piece for the same file from the piece store to the reply buffer,
  for each type 2 piece in the request buffer having a next indication, transferring the related type 3 piece from the piece store to the reply buffer,
  transmitting contents of the reply buffer to the apparatus;
  for each type 1 piece in the request buffer having a skip indication, removing all type 2 and type 3 pieces from the piece store, for each type 2 piece in the request buffer having a skip indication, removing the corresponding type 3 piece from the piece store, and removing all pieces which have been transferred to the reply buffer from the piece store, and waiting for a new request from the apparatus.

An embodiment comprises a system for bare metal backup of user disk storage comprising at least one local area network attached apparatus, coupled to a plurality of heterogeneous user stations, wherein each heterogeneous user station comprises
    at least one piece store,
    a piece store extraction circuit,
    a request reception circuit,
    a pieces management circuit
    a reply buffer, and
    a reply transmission circuit;

wherein the local area network attached apparatus comprises:
    means for requesting an object from a local area network attached user station, and
    means for restoring platform independent data files and data files adapted to a specific user's operating system configuration and file system.

An embodiment comprises a method for operating one of a plurality of heterogeneous user stations comprising the steps following:

within the request reception circuit,
    receiving from a local area network attached apparatus a skip flag,
    receiving from a local area network attached apparatus a next piece request,
    receiving from a local area network attached apparatus an object request;

within the piece store extraction circuit,
    removing from piece store and loading into the reply buffer the highest priority type piece of each file or each object, until the reply buffer is full;

within the pieces management circuit
    receiving at least one piece from each thread circuit and loading piece store, type 1 begin file, type 2 file data hash, type 3 file data,
    loading into the reply buffer no more than one type of piece of each file or each object;

within the reply transmission circuit;
    transmitting a reply to a local area network attached apparatus when the reply buffer is full,
    transmitting a reply to a local area network attached apparatus when no more pieces may be loaded from the piece store.

In an embodiment, the pieces further comprise:
an object attribute piece and an XML document piece,
wherein the method further comprises the steps following:
receiving at least one piece from each thread circuit and loading piece store with type 4 object attributes, type 5 XML document, type 1 begin file, type 6 file metadata, type 2 file data hash, type 3 file data, type 7 file end
whereby a transmission of a file data piece may be skipped if the apparatus determines it is unnecessary by examining one of the higher priority pieces.

An embodiment comprises a system for bare metal backup of user disk storage into a public network comprising:
a wide area network attached server coupled to
    at least one local area network attached apparatus, coupled to
a plurality of heterogeneous user stations,
wherein each heterogeneous user station comprises
    at least one piece store,
    a skip ahead store,
    a piece store extraction circuit,
    a request reception circuit,
    a pieces management circuit
    a reply buffer, and
    a reply transmission circuit;

wherein the wide area network attached server comprises:
    a circuit for receiving pieces comprising an operating system piece, a data hash piece, and an encrypted data piece,
    a circuit for determining a list of most commonly encountered pieces
    a circuit for requesting transmission of an encrypted data piece if a data hash is a new, and
    a circuit for restoring platform independent data files and data files adapted to a specific user's operating system configuration and file system;

wherein the local area network attached apparatus comprises:
    a circuit for requesting an object from a local area network attached user station,
    a circuit for transmitting pieces to a wide area network attached server,
    a circuit for encrypting a data piece
    a circuit for transmitting a list of most commonly encountered pieces e.g. data hashes, and
    a circuit for restoring platform independent data files and data files adapted to a specific user's operating system configuration and file system.

In an embodiment, a method for operating one of a plurality of heterogeneous user stations comprises the steps following:

within the request reception circuit,
    receiving from a local area network attached apparatus a skip flag,
    receiving from a local area network attached apparatus a next piece request,
    receiving from a local area network attached apparatus an object request;

within the piece store extraction circuit,
removing from piece store and loading into the reply buffer the highest priority piece of each file or each object, until the reply buffer is full;

within the pieces management circuit
    receiving at least one type piece from each thread circuit and loading piece store, of the following types:
begin file,
file data hash,
file data;
    loading into the reply buffer no more than one type piece of each file or each object;

within the reply transmission circuit;
    transmitting a reply buffer to a local area network attached apparatus when the reply buffer is full,
    transmitting a reply buffer to a local area network attached apparatus when no more pieces may be extracted from the piece store.

In an embodiment, the pieces further comprise:
an object attribute, an XML document, file meta data, and file end
wherein the method further comprises the steps following:
receiving at least one piece from each thread circuit and loading piece store, in the following order:
firstly, object attributes
secondly, XML document
thirdly, begin file
fourthly, file metadata
fifthly, file data hash sixthly, file data
seventhly, file end
whereby a transmission of a file data piece may be skipped if the apparatus determines it is unnecessary by examining one of the higher priority pieces.

An embodiment comprises a method for copying files from nonvolatile mass storage into a pieces store:
    placing the identity of each file selected for backup on a file list sorted by size,
    selecting a file from a certain position,
    converting each file into a hierarchy of pieces and a plurality of piece types,
    a single first piece type is written into piece store for each file comprising name, size, and date,
    at least one third piece type is written into piece store for each file of variable length but maximum size containing a data shard,
    a single second piece type is written into piece store for each third piece type.

In an embodiment, a certain position comprises positions at a top and bottom of the list whereby the largest file and the smallest file are each assigned to a thread and a third thread may be assigned to receive files taken at a certain position comprising the midpoint, the median, or nearest the mean.

In an embodiment, a certain position comprises the point half way between the smallest and the midpoint.

In an embodiment, the method further comprises:
    receiving from a backup apparatus a sorted list of most frequently encountered type 2 pieces already stored at the network attached backup apparatus,
    matching the type 2 piece determined by the method with a type 2 piece in the list of most frequently encountered type 2 pieces, and
    removing from pieces store the type 3 piece corresponding to a type 2 piece found on the list of the most frequently encountered type 2 pieces
whereby more room is available for additional type 1 and type 2 pieces in the pieces store, and
whereby computing and comparing hashes at each user station improves scalability of the network attached backup apparatus.

An embodiment comprises an apparatus comprising a nonvolatile mass store, coupled to at least one streams processor, and at least one piece store coupled to a streams processor.

An embodiment comprises a method comprising the following steps:
    reading a file from a nonvolatile mass store,
    determining a type 1 piece from the file and writing a type 1 piece into a piece store,
    determining at least one type 3 piece from the file and writing each type 3 piece into a piece store,
    determining one type 2 piece for each type 3 piece and writing each type 2 piece into a piece store,
    reiterating determination and writing steps of type 2 and type 3 pieces until reaching the file end.

In an embodiment, a type 3 piece is a data shard of variable length and maximum size.

In an embodiment, a type 2 piece is a data hash of fixed length corresponding to a specific type 3 piece.

An embodiment comprises, system for bare metal backup of user disk storage into a public network comprising
    a wide area network attached server coupled to
    at least one local area network attached apparatus, coupled to
    a plurality of heterogeneous user stations,
wherein each heterogeneous user station comprises 1. at least one piece store,
2. a piece store insertion circuit,
3. plurality of thread circuits,
4. a piece store purge circuit,
5. a sorted file list circuit, and
6. a computer readable storage apparatus;
wherein the wide area network attached server comprises:
    means for receiving pieces comprising an operating system piece, a data hash piece, and an encrypted data piece,
    means for requesting transmission of an encrypted data piece if a data hash is a new, and
    means for restoring platform independent data files and data files adapted to a specific user's operating system configuration and file system;
wherein the local area network attached apparatus comprises:
    means for requesting an object from a local area network attached user station,
    means for transmitting pieces to a wide area network attached server,
    means for encrypting a data piece, and
    means for restoring platform independent data files and data files adapted to a specific user's operating system configuration and file system.

In an embodiment, a plurality of heterogeneous user stations comprise at least one processor adapted by a first operating system and at least one processor adapted by a second operating system.

An embodiment comprises, a method for operating one of a plurality of heterogeneous user stations comprising the steps following: within the sorted file list circuit,
    receiving an object request from a local area network attached apparatus,
    selecting files related to the requested object,
    sorting the selected files on size,
    merging the selected files into the sorted file is list,
within each of the plurality of thread circuits,
    extracting a file from a certain position in the sorted file list,
    determining pieces wherein pieces comprise:
    1. begin file,
    2. file data,
    3. file data hash;
    determining a begin file piece,
    determining a file data piece,
    determining a file data hash piece,
    reiterating determination of file data and file data hash pieces;
within the piece store insertion circuit
    until a piece store is full, receiving pieces from one of a plurality of thread circuits,
    until a piece store is full, writing into the piece store the following pieces if available in the following order,
    1. firstly, begin file,
    2. secondly, file data hash,
    3. thirdly, file data;
resuming when the piece store has available space;
    within the piece store purge circuit,
    receiving a skip flag from a local area network attached apparatus in a request,
    identifying the pieces within the piece store related to the skip flag, and
    deleting from piece store each piece related to the skip flag.

In an embodiment, the pieces further comprise: an object attribute piece and an, file metadata piece,
wherein the method further comprises the steps following:
until a piece store is full, writing into the piece store the following pieces if available in the following order, firstly, object attributes
secondly, begin file
thirdly, file metadata
fourthly, file data hash
fifthly, file data.

In an embodiment, a certain position in the sorted file list comprises one of:
beginning of the sorted file list,
the end of the sorted file list, whereby the smallest file and the largest file are selected, and
the midpoint of the sorted file list, whereby data throughput is improved by selectively interlacing files with relatively higher overhead and files with relatively lower overhead.

In an embodiment, a certain position in the sorted file list comprises one of:
beginning of the sorted file list,
the end of the sorted file list, whereby the smallest file and the largest file are selected,
the midpoint of the sorted file list, and
a position substantially half way between the midpoint of the sorted file list and the smallest file position.

In an embodiment, a certain position in the sorted file list comprises one of:
beginning of the sorted file list,
the end of the sorted file list, whereby the smallest file and the largest file are selected, and
a plurality of positions substantially equidistant between the smallest and largest file positions.

Referring now to FIG. 1, the present invention comprises an apparatus comprising
a nonvolatile mass store 110
a file thread circuit 120
a sorted file list 130
a plurality of pieces thread circuits 141-143
a request buffer 160
a pieces store 170
a reply buffer 190.

In an embodiment the invention further comprises
a skip ahead store 150

The system further comprises local and wide area network attached backup servers 180.

Figure 2:
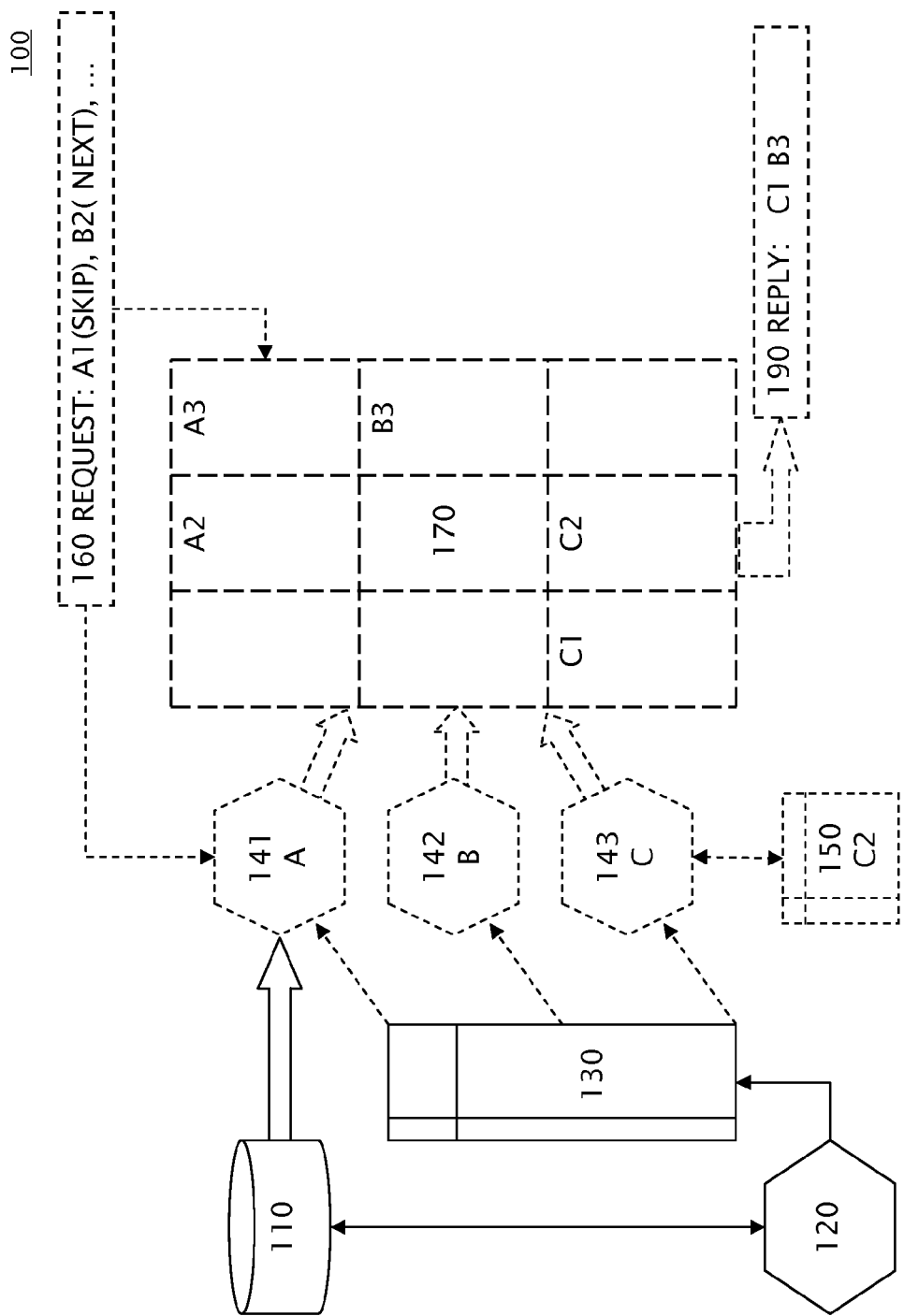

Referring now to FIG. 2, a final thread circuit 120 receiving an instruction to back up,
scans a nonvolatile mass store 110 for the selected objects or files,
and inserts the file identifiers into the sorted file list 130, ordered from largest files to smallest file.

Figure 3:
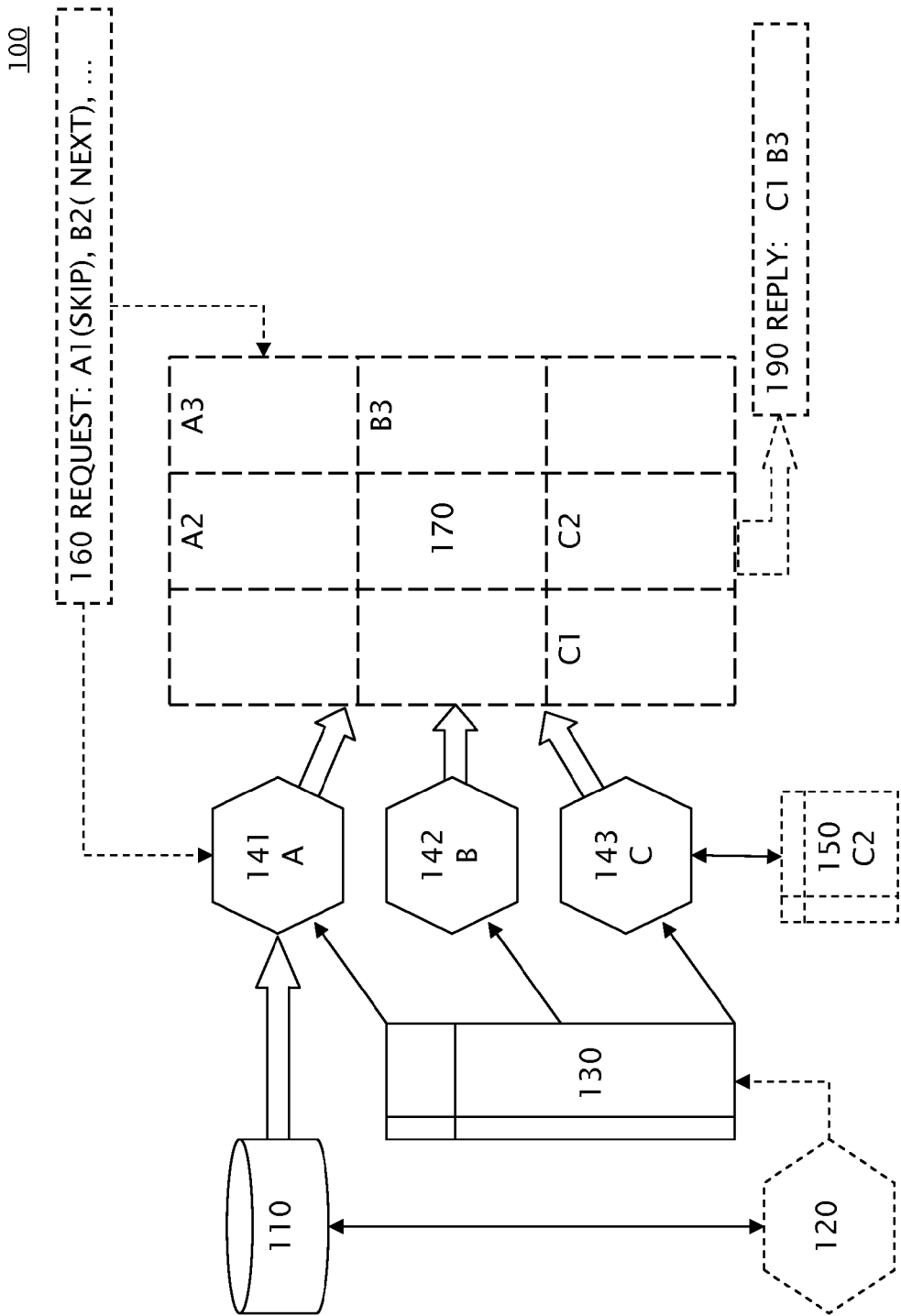

Referring now to FIG. 3,
a plurality of pieces thread circuits 141-143,
is coupled to the sorted file list 130,
and to nonvolatile mass store 110.

Each pieces thread circuit removes a file identifier from a certain position of the sorted file list. In an embodiment the certain points are the smallest, largest and the midpoint. Each pieces thread circuit converts a file into a hierarchy of pieces of a plurality of types. Threads and streams are interchangeable terms known to those skilled in the art.

Each pieces thread circuit is always processing files, from the sorted file list. In an embodiment the first stream picks from the top of the list, the second stream picks from the middle of the list, and the third stream picks from the end of the list. In the experience of the inventors, this provides the best performance when dealing with files of various sizes. Note the number of Streams is completely arbitrary and is not hard coded. When more are added the algorithm just averages out.

Figure 4:
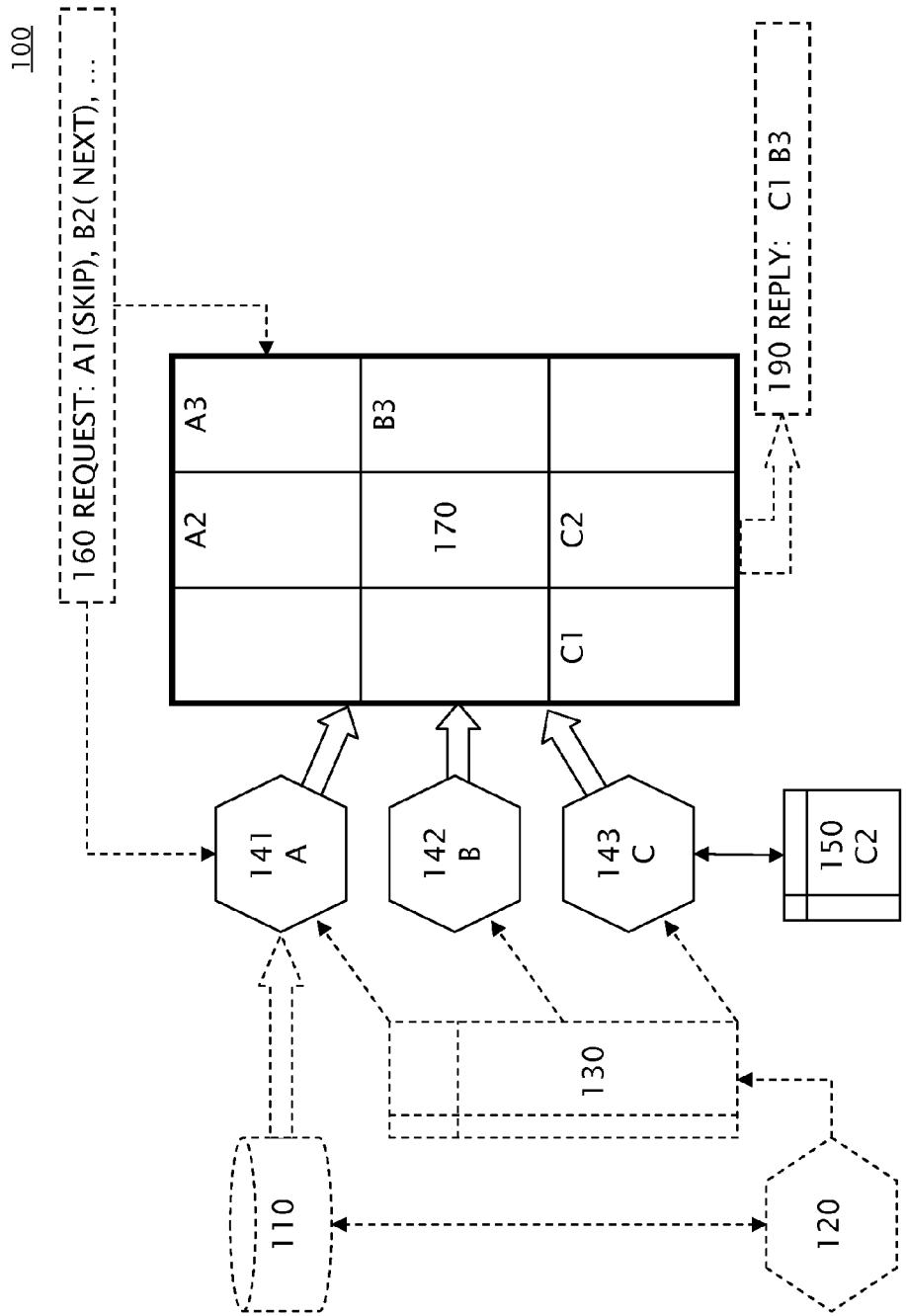

Referring now to FIG. 4, each pieces thread circuit 141-143 writes into available space in pieces store 170 and is blocked if there is no available space in pieces store 170. The first piece written into pieces store is a type 1. Each file has a one-to-one relationship with a type 1 piece. An exemplary non-limiting type 1 piece is a begin file comprising file size and state. One or more type 2 pieces are written into the pieces store 170 for each file. An exemplary non-limiting type 2 piece is a data hash computed on a type 3 piece comprising a data shard. A type 3 piece has a variable length up to a maximum size. In an embodiment each pieces thread circuit 140 writes a type 3 piece into available space in pieces store 170. In an embodiment, each pieces thread circuit 141-143 searches the contents of a skip ahead store 150 to determine if a type 3 piece can be discarded. In a non-limiting example, a skip ahead store 150 contains a sorted list of type 2 pieces which are most commonly encountered by a local area network or wide area network attached server 180. Each Stream writes to the Pieces Manager circuit, which in turn creates a plurality of Pieces from each file, and adds it to the Pieces store. This continues until the Pieces Store is filled up, in which case it will then block until someone requests or skips a Piece.

Figure 5:
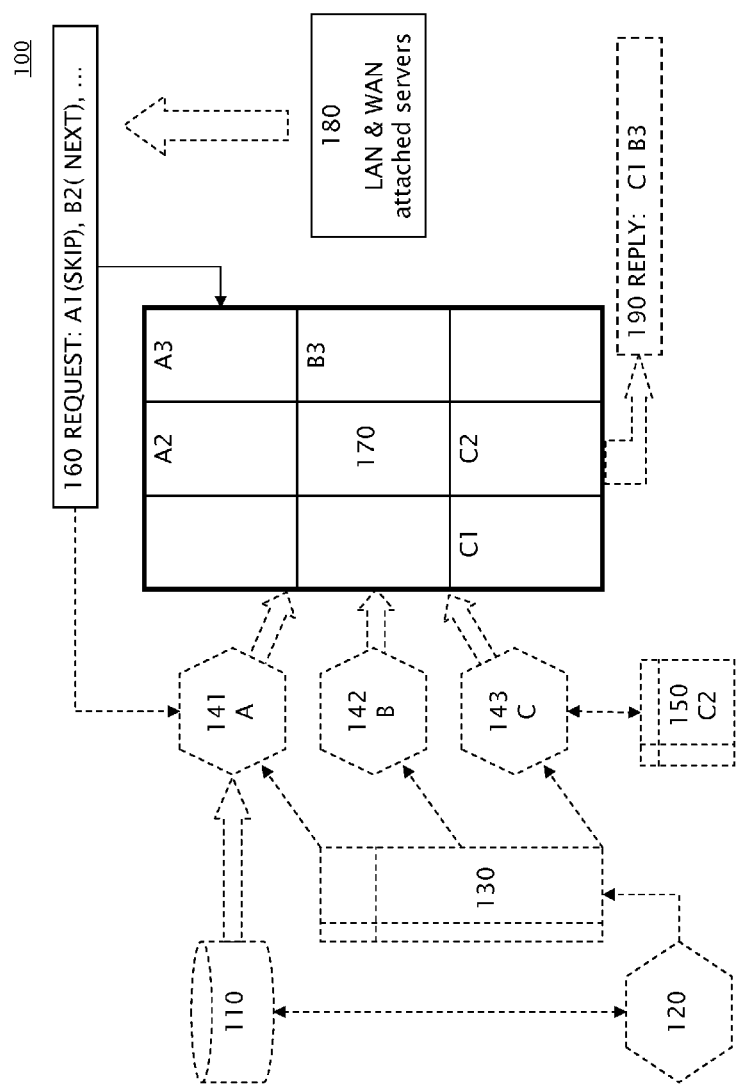

Referring now to FIG. 5, a request buffer 160 receives a request from the local area network or wide area network attached server 180. In the request buffer, previously transmitted pieces of files are flagged with either skip or next.
If a type 2 piece is flagged with skip, the corresponding type 3 piece is removed from pieces store,
If a type 1 piece is flagged with skip, every type 2 piece and type 3 piece related to that file is removed from pieces store 170,
Skipping creates available space in pieces store.

Figure 6:
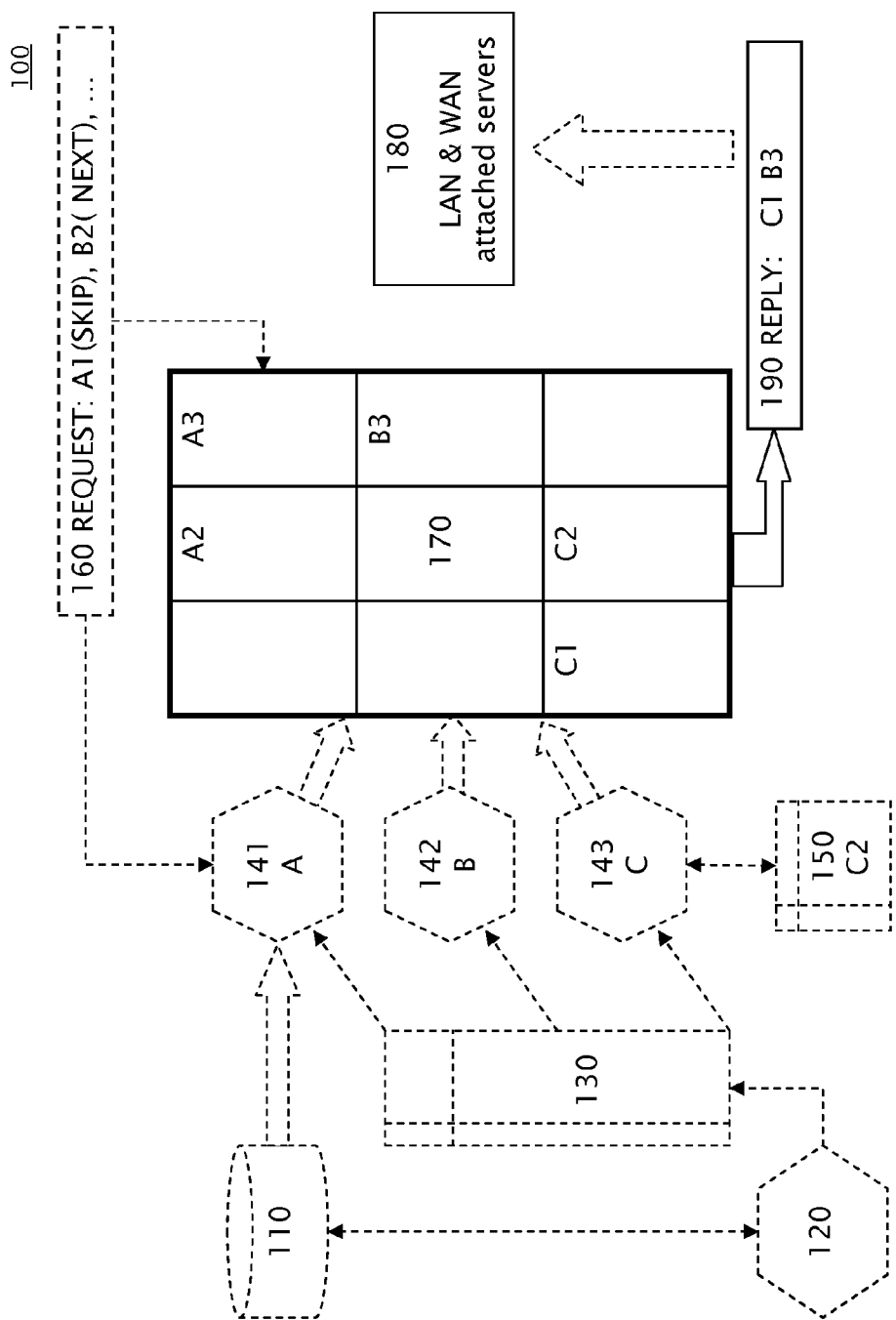

Referring now to FIG. 6, the reply buffer 190 is unconditionally loaded with every type 1 piece in the pieces store 170.
If a type 1 piece is flagged with next, every type 2 piece related to that file is loaded into the reply buffer 190.
If a type 2 piece is flagged with next, the corresponding type 3 piece is loaded into the reply buffer 190.

When the reply buffer is loaded, as many pieces as will fit and are available will be put in there.

This allows the requesting server to process a large number at once. In a non-limiting example, given a list of 100 file begins, compare them to a list and see only 3 have newer time stamps or different sizes, evokes skipping the other 97. Next, given a list of hashes, say for the 3 files there exist 42 hashes, but duplicative for all but 9. Skip mark all the duplicates for skipping and issue another request.

The difference in piece type is the underlying data, and how the requestor interprets the data to decide if it's to be skipped. File begins might provide info like file name, size, modification date/time, or other attributes. If all are identical to what has already been seen, the requestor can mark it skipped. Whereas a hash, is just the hash value, which would require an exact match.

It is important to note that data is never sent unless a network attached server wants it. File Begin Piece types are always sent first, and not any data hash entries. The same is true for data and data hashes. In an embodiment there are further piece types within the hierarchy of a file. Generally if type n piece is flagged with next, then at least one type n plus one piece is loaded into the reply buffer. In an embodiment there are 7 types of pieces:

Object Attribute—Meta data associated with the Object.
File Begin—File attributes, and path information. Files may have more then 1 path (hard links).
File Meta Data—File meta data that is used internally.

File Data Hash—MD5/SHA1 hash string for a File Data piece.

File Data—File data, with a WIN32 Stream ID.

File End—MD5/SHA1 hash for the entire file (data fork only).

Xml Document—A VSS xml meta data document Loading creates available space in pieces store.

Pieces store is searched by a request, and a piece of the requested type is sought for. If it cannot be found, the search type is bumped to the next one. The Pieces Manager does this until 1 Piece is found of a given type. It then adds as many pieces of that type as available into the reply buffer.

The search order goes as follows:
1. Object Attributes (Not shown)
2. XML Document (Not shown)
3. File Begin
4. File Meta Data
5. File Data Hash
6. File Data
7. File End The initial Request Buffer is of course blank, as this is the first one. The Reply Buffer is then populated, according to the search rule order specified above, and in this case, all File Begin Pieces are added to the Reply Buffer.

Figure 7:
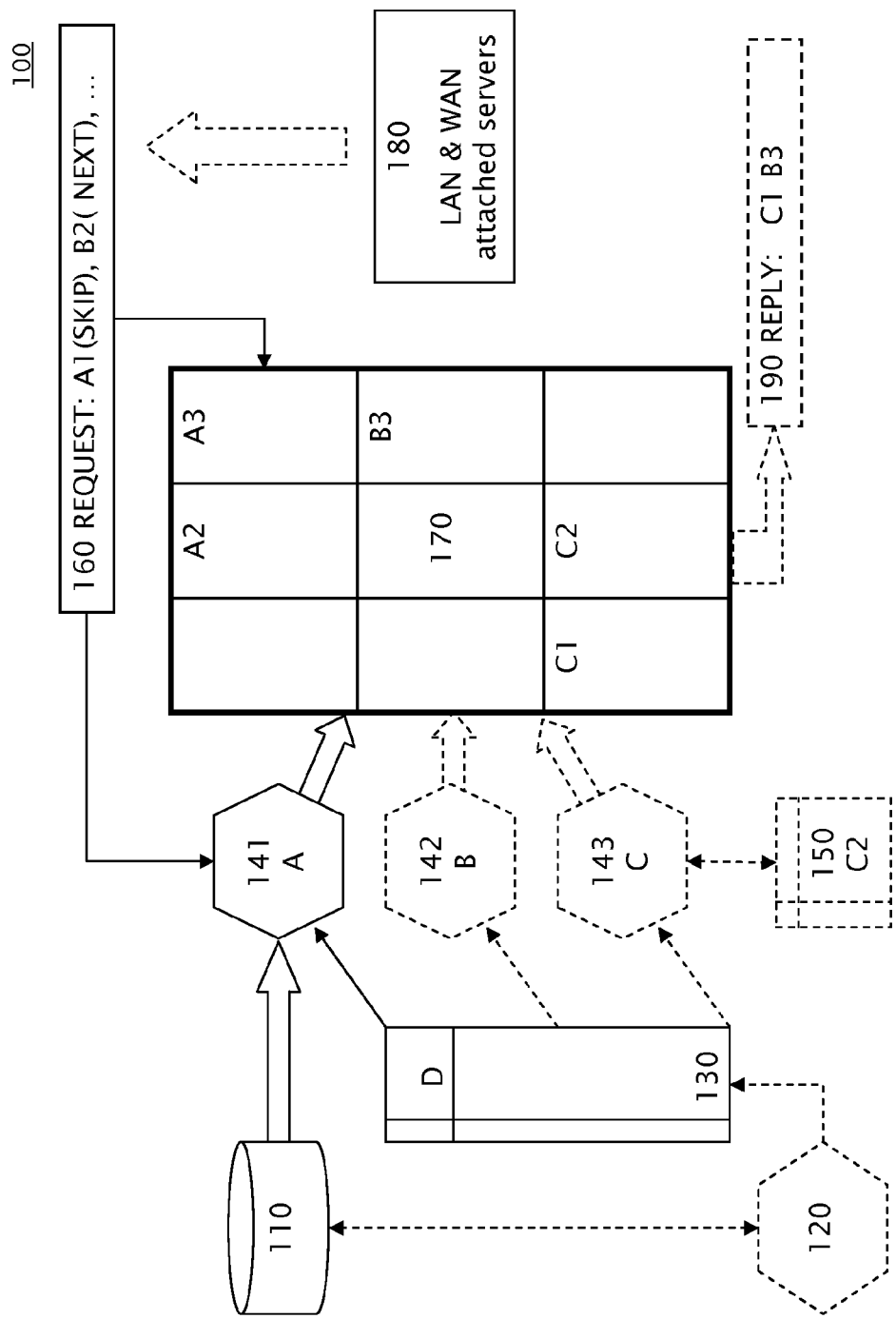

Referring now to FIG. 7, a pieces thread circuit 141 operating on a large file such as file A in FIG. 7 may still be accessing non-volatile mass store 110 to create further type 2 and type 3 pieces when a request buffer is received containing a type 1 piece for file A flagged with skip. In an embodiment, the request buffer signals pieces thread circuit 141 to discontinue operating on file A and to remove a new file from the sorted file list 130, in an example, file D. This shows how files are skipped in mid backup, even if they have not been fully added to a pieces store, when the network attached server chooses to skip it based on the File Begin Piece.

Figure 8:
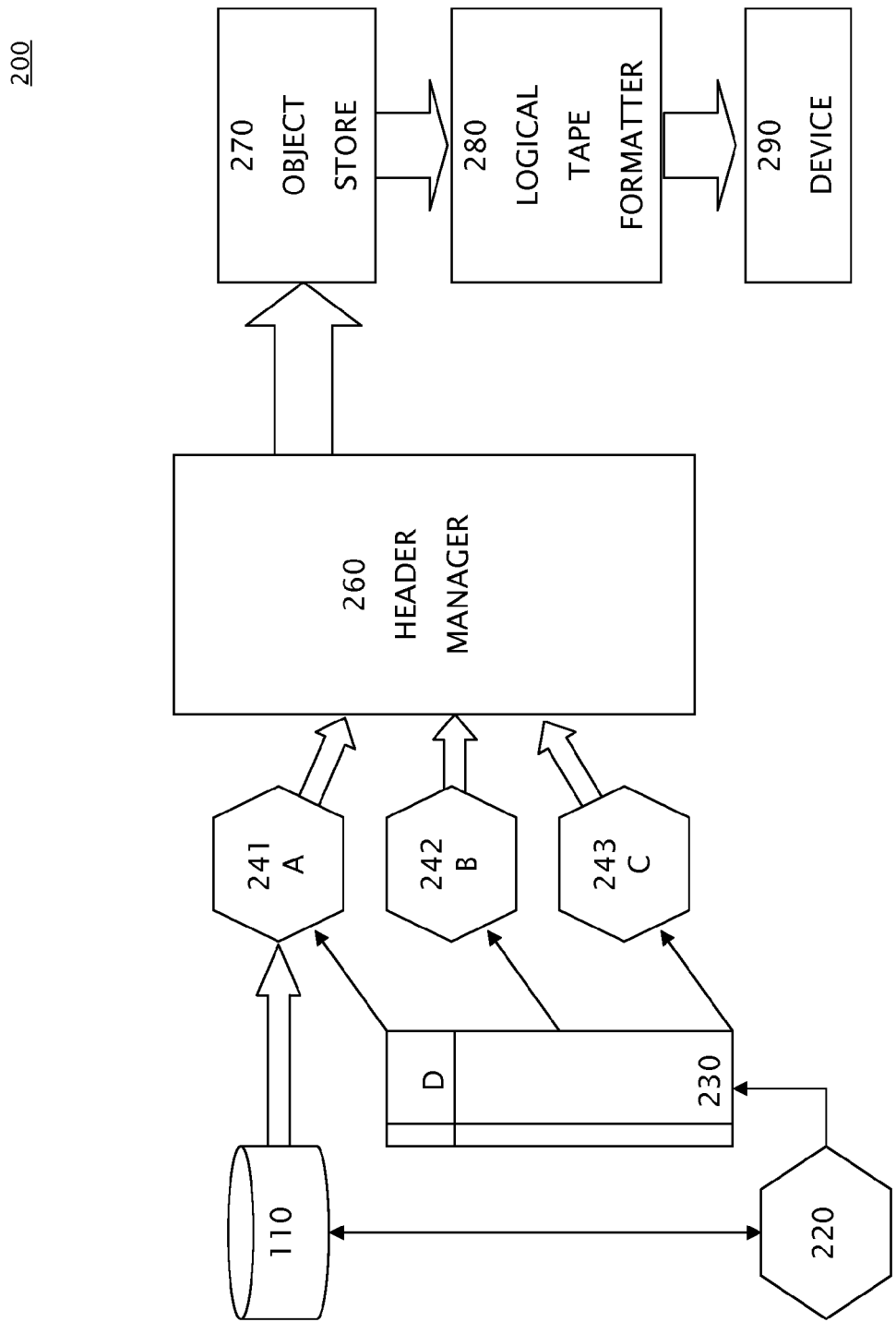

Referring now to FIG. 8, an object stored on non-volatile mass store 110, is scanned by a stream manager circuit 220. The stream manager circuit comprises a circuit to determine the index at which a stream circuit will remove a file identifier from the sorted file list 230. The stream manager circuit comprises a circuit to determine the number of stream circuits to control a processor. The stream manager circuit comprises a circuit to determine when to add or remove a stream circuit. The invention provides dynamic tuning by measuring performance and increasing or decreasing the number of stream circuits which are adapted to control a processor. The stream manager circuit 220 determines the location in a sorted file list 230 at which a file identifier is inserted.

The Stream manager creates or deletes Stream circuits 241-243 as needed. There may be 1, or 10, or 20 Stream circuits, depending on the capabilities of processor adapted by the host operating system. The key here is that they can be dynamically instantiated or deleted, by the Stream manager, which is also running as a separate thread, checking the performance of the system. This performance metric is controlled by microcode updates.

Here is one non-limiting exemplary method for deciding the Stream circuits will remove a file identifier from the Sorted File List at substantially equal intervals:

Assigning each Stream circuit an identifier, the first one has an id of 0.

If the Stream ID is 0, it will pull from the start of the Sorted File List. If the VAM Stream ID is "Total Number Of Streams", it will pull from the end of the Sorted File List.

In one embodiment this simple equation is used to determine what index will be used:

IndexInSortedFileList=(StreamId/TotalNumberOfStreams−1)*(TotalNumberOfFilesInSortedList−1);

The list is then iterated until the index is found, and then the stream circuit operates on that file. All stream circuit outputs combined in the header manager 260 and written into the object store 270.

Data is taken from the object store 270, and is encapsulated further by the Logical Tape Formatter 280 (an object that defines our sequential format on device (e.g. Tape)), and from there it is written to the device 290. The LTF encapsulates the entire object, and cannot parse the contents of the object itself. Without substantially departing from the invention, other embodiments can bias selection toward larger or smaller files, file types, file extents, or other sortable characteristics.

CONCLUSION

The multi-streaming method is distinguished from conventional file access methods independent of its inclusion with hashing. Scheduling disk I/O by file size is not intuitive. Conventional disk I/O follows the directory structure, or the naming convention, or the physical organization. It is the observation of the applicants that conventional disk I/O scheduling is sub-optimal in throughput. Overall performance is improved by a multi-streaming method where one stream only manages a list, placing smaller files at one end and larger files at the other and assigning other streams to operate on files in certain positions including but not limited to a stream exclusively operating on a series of small files and a second stream exclusively operating on a series of large file. Throughput is measurably improved by an additional stream at a certain point. An exemplary non-limiting certain point is the middle of the list. While it may seem obvious to anticipate that any mixing of small and large files would be beneficial, it turns out not to be the case. Conventional multi-threading has also been tested and found inferior.

The present invention is distinguished from conventional backup systems by providing more efficient backup of heterogeneous non-volatile mass store to a network attached server by efficient use of the wire, and distributed load for hash generation.

Only data that the network attached server needs are sent, otherwise the only thing sent are "hashes" (strings essentially) describing the data signature. Some of the features include the ability for the server to "skip" large files in mid I/O, causing them to be closed early without needlessly reading them into the cache. The number of cache entries, and the number of streams reading files on the server is fully adjustable. In an embodiment the data shards are at most 1 meg is size, and they broken up into stream types, so that the server can easily separate out the OS specific streams (Such as permission forks, and stream headers), from their cross platform data parts, to facilitate cross platform restore of just the data portion.

The present invention is distinguished from conventional backup methods by scalable distribution of backup processes for computing hashes and eliminating duplication.

The present invention is distinguished from conventional backup methods by increased granularity of file pieces. As a result file I/O may be more efficient and improved packing of network transmission blocks provide overall higher throughput thereby addressing twin bottlenecks of conventional backup systems.

The present invention is distinguished from conventional backup methods by efficiently packing each network transmission block using a sequenced search criteria. Within a hierarchy of piece types, a first piece type may have a one to many relationship with a plurality of second piece types and a third piece type has a one to one relationship with each second piece type. Only one type of piece for any file may be transmitted at a time in order to avoid sending undesired pieces.

The present invention is distinguished from conventional backup methods by distributed segmentation of each file and object into a hierarchy of pieces in a plurality of types.

By means of the claimed invention, applicants optimize the use of network resources by transmitting full buffers and avoid sending unnecessary pieces. In addition disk accesses are optimized to minimize overhead at the user station. In addition certain computations and comparisons are scalability distributed from a central location to each user station.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

What is claimed is:

1. A multi-streamed method for parallelized interlacing of data for backup comprises:
   receiving and storing a list of most frequently encountered type 2 pieces each of which comprise a data hash determined from a type 3 piece which comprise a file data shard having variable length up to a maximum size;
   receiving and storing a list of object identities organized by file size wherein objects comprise files;
   operating on a plurality of files simultaneously using a plurality of parallel threads controlling one or more processors by
      determining a single type 1 piece for each file which type 1 piece comprises file name, size, and date,
      determining at least one type 3 piece for each file and
      determining a single type 2 piece for each type 3 piece;
   within a first parallel thread, while there is any object identity remaining on said list of object identities organized by file size,
      removing a top file identity from a top of the list,
      reading a top file from non-volatile mass store, and
      operating on said top file to determine type 1, type 2, and type 3 pieces;
   within a second parallel thread, while there is any object identity remaining on said list of object identities organized by file size,
      removing a bottom file identity from a bottom of the list,
      reading a bottom file from non-volatile mass store, and
      operating on said bottom file to determine type 1, type 2, and type 3 pieces;
   until piece store is full, in the following order, for each file operated on,
      writing type 1 piece to a piece store, then, subsequently
      writing one or more type 2 pieces to the piece store, and finally,
      writing one or more type 3 pieces to the piece store;
      comparing each type 2 piece stored in the piece store with—the list of most frequently encountered type 2 pieces, and
      removing from the piece store any type 3 piece which corresponds to a most frequently encountered type 2 piece.

2. The method of claim 1 further comprising:
   for each file read from non-volatile mass store,
      reiterating determination and writing steps of type 2 and type 3 pieces until reaching the file end.

3. The method of claim 1 wherein a type 2 piece is a data hash of fixed length corresponding to a specific type 3 piece.

4. A method for operating each one of a plurality of heterogeneous user stations comprising:
within a sorted file list circuit,
receiving an object request from a local area network attached apparatus,
selecting files related to the requested object,
sorting the selected files on size,
merging all identifiers of the sorted selected files into a sorted file list,
within each of a plurality of thread circuits,
extracting a plurality of files at certain positions in the sorted file list,
wherein certain positions in the sorted file list comprises:
beginning of the sorted file list,
end of the sorted file list, and
a midpoint of the sorted file list,
for each extracted file,
determining a begin file piece,
determining a first file data piece,
determining a first file data hash piece,
reiterating determination of file data and file data hash pieces;
within a piece store insertion circuit,
until each piece store is full, receiving pieces from one of a plurality of thread circuits,
until each piece store is full, writing into the piece store the following pieces if available in the following order, firstly, begin file piece, secondly, file data hash piece, thirdly, file data piece, wherein a file data piece comprises a data shard of variable length and maximum size, and a file data hash piece comprises a data hash of fixed length corresponding to a specific file data piece, and a begin file piece comprises file name, size, and date,
receiving and storing a list of file data hash pieces determined from file data pieces previously stored at the local area network attached apparatus,
removing from the piece store any file data piece which was previously stored at the local area network attached apparatus.

5. The method of claim 4 wherein the pieces further comprise: an object attribute piece and file meta data piece, wherein the method further comprises the steps following:
until a piece store is full,
writing into the piece store the following pieces if available in the following order, firstly, object attribute piece, secondly begin file piece, thirdly, file metadata piece, fourthly, file data hash piece, and fifthly, file data piece.

6. The method of claim 4 wherein certain positions in the sorted file list comprise:
beginning of the sorted file list,
an end of the sorted file list furthest from the beginning,
a midpoint of the sorted file list, and
a position substantially half way between the midpoint of the sorted file list and the position of a file having the smallest size.

7. A method for scheduling file access to a non-volatile mass store by a plurality of parallel threads controlling a processor to convert each stored file into a hierarchy of pieces for efficient backup without duplication comprising:
determining a list of files for processing,
sorting the list of files by an orderable characteristic,
assigning a certain position in the list of files to a first thread controlling a processor,
assigning an other certain position in the list of files to a second thread controlling a processor,
assigning at least one intermediate point of the list of files to one or more additional threads,
wherein certain positions comprises a first position at a top and a second position at a bottom of the list and a third thread is assigned to receive files taken at a point half way between a bottom of the list and a midpoint of the list;
wherein the orderable characteristic is file size and wherein each thread controls a processor to perform:
converting each file into a hierarchy of pieces and a plurality of piece types;
writing a single begin file piece into piece store for each file the begin file piece comprising name, size, and date;
writing at least one file data piece of variable length but maximum size containing a data shard, into piece store; and
writing a single file data hash piece into piece store, the filed data hash piece comprising a data hash for each file data piece.

* * * * *